US011506360B2

(12) United States Patent
Yui et al.

(10) Patent No.: US 11,506,360 B2
(45) Date of Patent: Nov. 22, 2022

(54) OPTICAL ELEMENT AND OPTICAL DEVICE

(71) Applicant: SHARP KABUSHIKI KAISHA, Sakai (JP)

(72) Inventors: Hideomi Yui, Osaka (JP); Shigeru Aomori, Osaka (JP); Tsuyoshi Kamada, Osaka (JP); Hidetsugu Matsukiyo, Osaka (JP); Toru Kanno, Osaka (JP); Hirokazu Ichinose, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/287,963

(22) PCT Filed: Oct. 17, 2019

(86) PCT No.: PCT/JP2019/040939
§ 371 (c)(1),
(2) Date: Apr. 22, 2021

(87) PCT Pub. No.: WO2020/085204
PCT Pub. Date: Apr. 30, 2020

(65) Prior Publication Data
US 2021/0372593 A1 Dec. 2, 2021

(30) Foreign Application Priority Data

Oct. 22, 2018 (JP) .............................. JP2018-198686

(51) Int. Cl.
F21V 9/45 (2018.01)
F21S 41/176 (2018.01)
(Continued)

(52) U.S. Cl.
CPC ................ *F21V 9/45* (2018.02); *F21S 41/16* (2018.01); *F21S 41/176* (2018.01);
(Continued)

(58) Field of Classification Search
CPC .... F21V 9/45; F21V 13/08; F21V 9/32; F21S 41/16; F21S 41/176; F21S 41/321;
(Continued)

(56) References Cited

U.S. PATENT DOCUMENTS

2007/0057626 A1 3/2007 Kurihara et al.
2012/0243203 A1* 9/2012 Koike ..................... F21S 41/16
362/19
(Continued)

FOREIGN PATENT DOCUMENTS

CN 1932370 A 3/2007
DE 102016116744 A1 * 3/2018
(Continued)

Primary Examiner — Rajarshi Chakraborty
Assistant Examiner — Glenn D Zimmerman
(74) Attorney, Agent, or Firm — ScienBiziP, P.C.

(57) ABSTRACT

Provided is compatibility between adhesion to a substrate (lower layer) and durability improvement. An optical element includes a phosphor layer facing a lower layer, and a bonding layer keeping the phosphor layer in intimate contact with the lower layer. The phosphor layer includes an inorganic binder, and phosphor particle dispersed with the inorganic binder. The bonding layer includes an organic binder. The phosphor layer has a first surface facing the lower layer, a second surface opposite to the first surface, and a side surface connecting the first and second surfaces together. The bonding layer connects together the second surface, the side surface, and a surface of the lower layer to keep the phosphor layer in intimate contact with the lower layer.

14 Claims, 16 Drawing Sheets

(51) Int. Cl.
*F21S 41/16* (2018.01)
*F21S 41/32* (2018.01)
*F21S 45/47* (2018.01)
*F21V 13/08* (2006.01)
*G02B 26/00* (2006.01)
*G03B 21/20* (2006.01)

(52) U.S. Cl.
CPC ............. *F21S 41/321* (2018.01); *F21S 45/47* (2018.01); *F21V 13/08* (2013.01); *G02B 26/008* (2013.01); *G03B 21/204* (2013.01)

(58) Field of Classification Search
CPC ..... F21S 45/47; G02B 26/008; G03B 21/204; C09K 11/7774; C09K 11/02; H04N 9/31
See application file for complete search history.

(56) References Cited

U.S. PATENT DOCUMENTS

| | | |
|---|---|---|
| 2013/0003347 A1 | 1/2013 | Maemura et al. |
| 2015/0102722 A1* | 4/2015 | Ohbayashi ............ F21S 41/176 428/447 |
| 2015/0146410 A1 | 5/2015 | Maemura et al. |
| 2015/0346593 A1 | 12/2015 | Masuda |
| 2017/0074466 A1* | 3/2017 | Redpath ................ G02B 27/425 |
| 2017/0315432 A1* | 11/2017 | Takamatsu ........... H04N 9/3161 |
| 2017/0357151 A1* | 12/2017 | Okuda ................. H04N 9/3164 |
| 2018/0231879 A1* | 8/2018 | Chang .................... G03B 33/12 |
| 2019/0072243 A1 | 3/2019 | Egawa |
| 2019/0153313 A1* | 5/2019 | Lüchinger .............. C09K 11/02 |
| 2020/0392402 A1* | 12/2020 | Lüchinger ......... G02F 1/133617 |

FOREIGN PATENT DOCUMENTS

| | | | | |
|---|---|---|---|---|
| EP | 3753994 B1 * | 6/2021 | ............... | C09D 5/22 |
| JP | 2013-016268 A | 1/2013 | | |
| JP | 2015097256 A | 5/2015 | | |
| JP | 2016-012116 A | 1/2016 | | |
| JP | 2016-170357 A | 9/2016 | | |
| JP | 2016-186850 A | 10/2016 | | |
| JP | 2017-083581 A | 5/2017 | | |
| WO | WO-2016121721 A1 * | 8/2016 | | |

* cited by examiner

OPTICAL ELEMENT AND OPTICAL DEVICE

TECHNICAL FIELD

The present invention relates to an optical element and an optical device.

This application claims priority to Japanese Patent Application No. 2018-198686, filed on Oct. 22, 2018, the content of which is herein incorporated by reference.

BACKGROUND ART

In a conventionally known technique, a phosphor that has undergone irradiation with excitation light, such as blue laser light, radiates fluorescence. For instance, Patent Literature 1 describes a phosphor wheel that includes a base and a phosphor layer disposed on the base. The phosphor layer has phosphor particles and a binder retaining the phosphor particles. The phosphor layer is covered with a low-refractive-index layer made of material that is transparent to light and has a lower refractive index than the phosphor particles.

CITATION LIST

Patent Literature

Patent Literature 1: Japanese Patent Application Laid-Open No. 2016-170357

SUMMARY OF INVENTION

Technical Problem

A phosphor that emits high-brightness light in response to excitation light of high energy density tends to have high temperature, possibly lowering the quantum efficiency of the phosphor. To solve this problem, an optical element is known that includes a phosphor enclosed by an inorganic binder of high thermal conductivity. Unfortunately, the inorganic binder has poor adhesion to a substrate and has low toughness.

It is an object of one aspect of the present invention to improve durability while maintaining adhesion to a substrate.

Solution to Problem

To solve the problem, an optical element according to one aspect of the present invention includes a phosphor layer facing a lower layer, and a bonding layer keeping the phosphor layer in intimate contact with the lower layer. The phosphor layer includes an inorganic binder, and phosphor particles dispersed within the inorganic binder. The bonding layer includes an organic binder. The phosphor layer has a first surface facing the lower layer, a second surface opposite to the first surface, and a side surface connecting the first and second surfaces together. The bonding layer connects together the second surface, the side surface, and a surface of the lower layer to keep the phosphor layer in intimate contact with the lower layer.

Advantageous Effect of Invention

The aspect of the present invention can improve durability while maintaining adhesion to a substrate.

DESCRIPTION OF EMBODIMENTS

Figure 1:
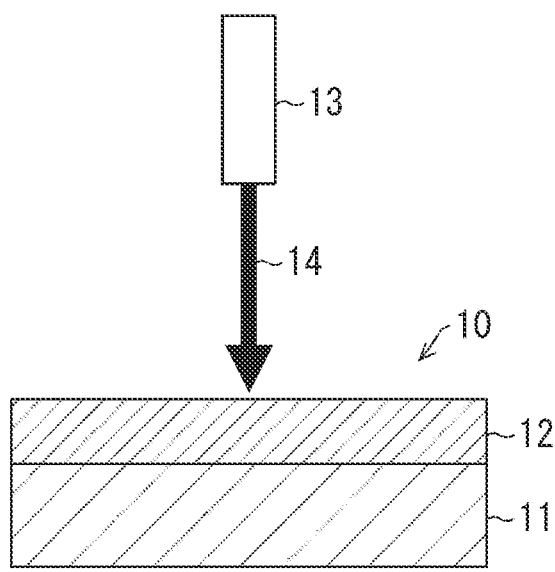
FIG. 1 is a sectional view of the configuration of an optical element.

FIG. 1 illustrates the configuration of an optical element 10, which is a typical optical element. In a typical configuration, a phosphor layer 12 is disposed on a substrate 11. In a reflective optical system, the phosphor layer 12 radiates fluorescence upon irradiated with excitation light 14 from a light source 13. The phosphor layer 12 typically consists of phosphor particles and an organic binder. An organic binder, which has high adhesion but has low thermal conductivity, is burned and damaged by heat when a phosphor is caused to radiate light with a blue laser or other things. Consequently, a desired luminous intensity of fluorescence cannot be achieved. That is, the temperature dependence of the luminous efficiency of a phosphor needs to be considered.

Temperature Dependence of Luminous Efficiency

The temperature dependence of the luminous efficiency of a phosphor will be described based on the external quantum efficiency of a YAG:Ce ($Y_3Al_5O_{12}:Ce^{3+}$) phosphor. Referring to a phosphor material of cerium (Ce)-doped yttrium aluminum garnet (YAG), the graph of FIG. 2 demonstrates that different Ce-doping concentrations involve different temperature dependences of luminous efficiency. Ce-doping concentration (mol %) in one aspect of the present invention is expressed as xx100 (mol %) in a substance expressed by a typical formula of a garnet phosphor, that is, $(M_{1-x}RE_x)_3Al_5O_{12}$. In this typical formula, M and RE contain at least one element selected from a rare-earth element group. It is common that M contains at least one kind of element selected from among Sc, Y, Gd, and Lu, and that RE contains at least one kind of element selected from among Ce, Eu, and Tb.

Irradiating a phosphor with excitation light offers fluorescent emission and converts part of the excitation light into thermal energy; hence, the temperature of the phosphor gets high at its irradiation spot. Heat radiation can be typically expressed by the following expression:

$$Q = A \cdot \varepsilon \cdot \sigma \cdot (T_A^4 - T_B^4).$$

Here, Q denotes the amount of radiated heat; A, the area of a radiation part; ε, radiation rate; σ, the Stefan-Boltzmann constant; $T_A$, the temperature of the radiation part; and $T_B$, surrounding temperature.

It is known that the luminous efficiency of a phosphor is affected by its temperature and decreases along with temperature increase. Obtaining an emission of fluorescence of higher intensity (i.e., brighter fluorescence) requires the excitation light 14 to be radiated at an enhanced intensity; in some cases, temperature rise in the phosphor layer 12 cannot be sufficiently prevented depending on cooling conditions.

Figure 2:
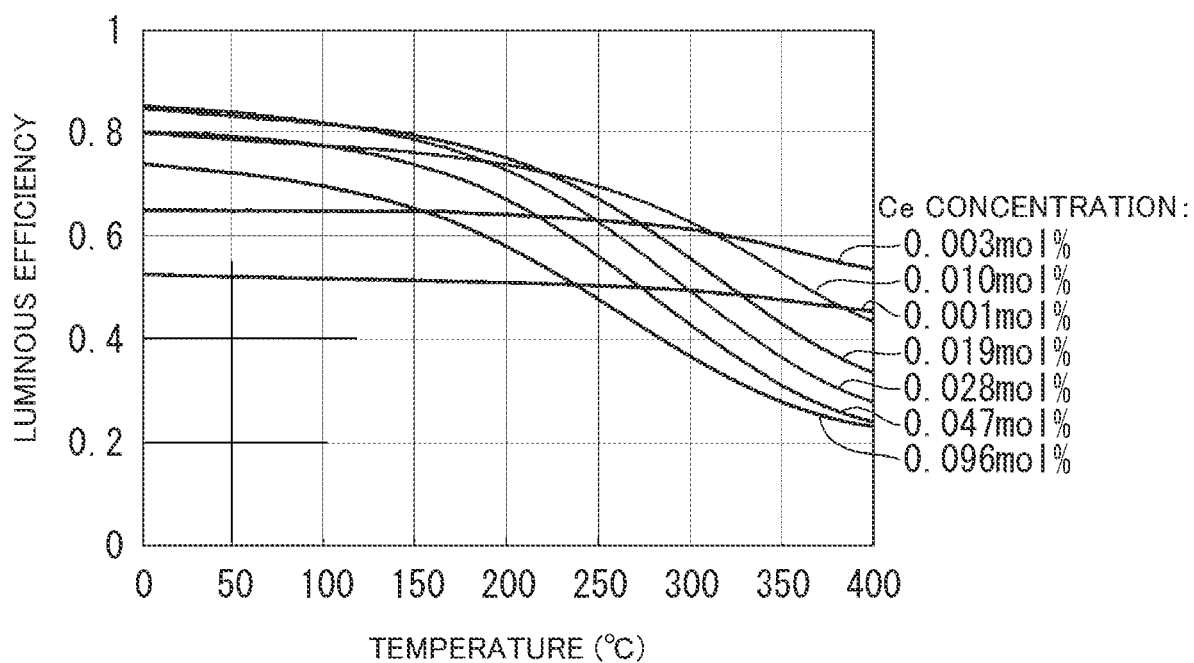
FIG. 2 is a graph showing the luminous efficiency of a YAG:Ce phosphor.

It is also known that the temperature properties of a phosphor vary depending on the concentration of an element (in this embodiment, Ce) that emits light mainly. A typical commercial YAG:Ce phosphor often has a Ce concentration at which luminous efficiency is high during room-temperature use (for instance, 1.4 to 1.5 mol %). This is because that since a YAG phosphor of low Ce-concentration has high internal quantum efficiency but has low rate of absorbing excitation light, the external quantum efficiency of such a YAG phosphor important for serving as a wavelength-converting element is optimal at a Ce concentration of around 1.5 mol %. As shown in FIG. 2, the luminous efficiency of a typical YAG:Ce phosphor (Ce concentration of 1.4 mol %) decreases when the temperature of the phosphor at its radiation spot exceeds 250° C. as a result of the irradiation with excitation light of high energy density and high intensity. However, a YAG:Ce phosphor having a low Ce concentration (e.g., about 0.3 to 1.0 mol %) has luminous efficiency that less depends on temperature, and when compared to low temperature, a reversal in luminous efficiency can occur between such a YAG:Ce phosphor and a high-concentration luminescent element. In the graph of FIG. 2, a comparison is made for instance between a low-temperature range (50 to 100° C.) and a high-temperature range (250 to 350° C.). In the low-temperature range, a YAG:Ce phosphor of higher Ce concentration tends to have higher luminous efficiency, whereas in the high-temperature range, a YAG:Ce phosphor of lower Ce concentration tends to have higher luminous efficiency. Each embodiment of the present invention will be described in view of this tendency.

Laser light excitation, which involves high excitation energy density and high temperature, preferably uses an oxide nitride phosphor or nitride phosphor that is highly resistant to heat. A more preferable phosphor has luminous efficiency such that temperature dependence is excellent. In addition, for use as a light source device, a phosphor may radiate light of color other than white, including blue, green, and red.

$CaAlSiN_3:Eu^{2+}$ for instance can be used as a phosphor that converts near-ultraviolet light into red light. Ca-α-SiAlON:$Eu^{2+}$ for instance can be used as a phosphor that converts near-ultraviolet light into yellow light. β-SiAlON:$Eu^{2+}$ and $Lu_3Al_5O_{12}:Ce^{3+}$ (LuAG:Ce) for instance can be used as a phosphor that converts near-ultraviolet light into green light. For instance, $(Sr, Ca, Ba, Mg)_{10}(PO_4)_6C_{12}:Eu$, $BaMgAl_{10}O_7:Eu^{2+}$, and $(Sr, Ba)_3MgSi_2O_8:Eu^{2+}$ can be used as a phosphor that converts near-ultraviolet light into blue light.

Moreover, a fluorescent member may be provided that includes two kinds of phosphor that convert near-ultraviolet excitation light into yellow light and blue light. Accordingly, pseudo white light is obtained by mixing together yellow and blue fluorescence radiated from the fluorescent member.

With regard to an example YAG:Ce phosphor in a preferred embodiment, the following describes the present invention for each embodiment.

Referring to optical elements according to the embodiments of the present invention, each of first to eighth embodiments will describe, by way of example, an optical element and fluorescent wheel disposed on a substrate.

First Embodiment

Configuration of Optical Element 101a

Figure 3A:
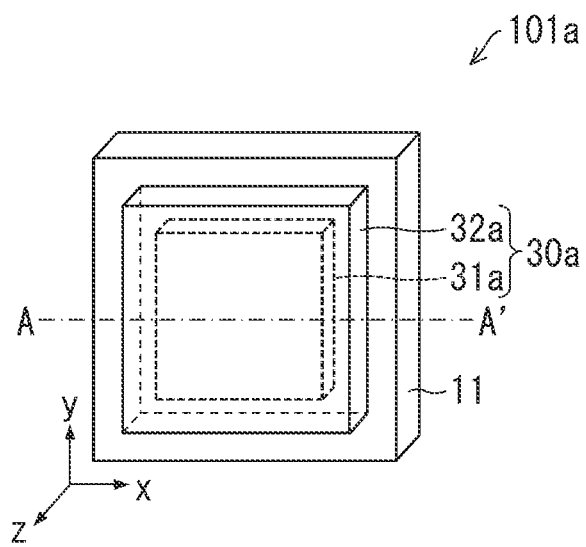
FIG. 3A is a perspective view of the configuration of an optical element according to a first embodiment of the present invention.
Figure 3B:
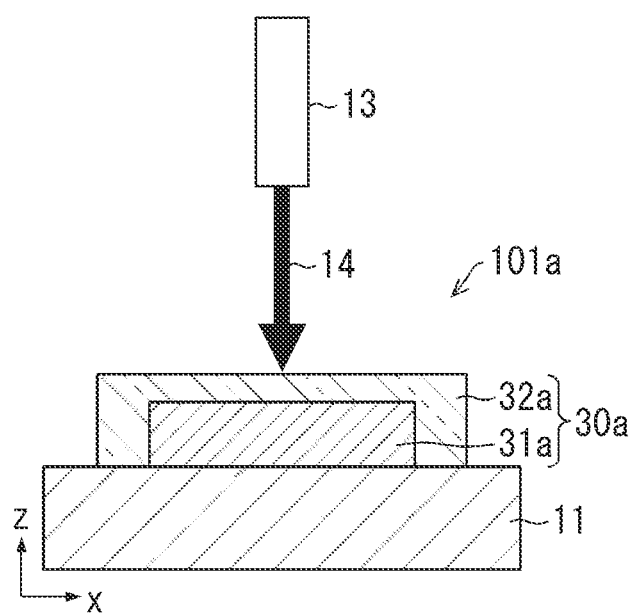
FIG. 3B is a sectional view of the configuration of the optical element according to the first embodiment of the present invention, taken along line A-A'.

One embodiment of the present invention will be detailed. FIG. 3A is a perspective view of the configuration of an optical element 101a according to the first embodiment of the present invention. In this embodiment, a coordinate axis is defined with a main surface of the substrate 11 being an x-y plane. FIG. 3B is a sectional view (x-z plane) of the configuration of the optical element 101a according to the first embodiment of the present invention, taken along line A-A'. Unlike the configuration of the typical optical element 10 in FIG. 1, the optical element 101a according to this embodiment further includes a bonding layer.

As illustrated in FIGS. 3A and 3B, the optical element 101a according to this embodiment has a wavelength converting portion 30a that includes a phosphor layer 31a facing the substrate 11 and includes a bonding layer 32a keeping the phosphor layer 31a in intimate contact with the substrate 11. The phosphor layer 31a in this embodiment faces the substrate 11, which is a lower layer.

Substrate (Lower Layer)

The substrate 11 can be an aluminum substrate. To enhance the luminous intensity of fluorescence, the aluminum substrate is preferably coated with a high-reflection film, such as a silver film. In other embodiments, a high-reflection alumina substrate, a white scatter reflection substrate, and other types of substrate may be used. The substrate 11 is preferably made of material, such as metal, that has higher thermal conductivity than the phosphor layer 31a and bonding layer 32a, and the material is not limited to the foregoing.

The lower layer is preferably composed of one or more layers including a substrate. Other than the substrate, an example of a layer forming the lower layer is a scattering layer. It is preferable that the scattering layer be mainly composed of titanium oxide. Further, the lower layer is, but not limited to, a plate-shaped layer and needs to be any base having a shape on which the phosphor layer 31a can be placed.

Phosphor Layer

The phosphor layer 31a includes a first binder (inorganic binder) containing an inorganic compound, and phosphor particles dispersed within the first binder. The phosphor layer 31a has a first surface facing the substrate 11, a second surface opposite to the first surface, and side surfaces connecting the first and second surfaces together.

The phosphor particles radiates fluorescence and heat when the phosphor layer 31a is irradiated with the excitation light 14 from the light source 13, which is a laser or LED for instance.

The phosphor layer 31a has high thermal conductivity, because the first binder contains an inorganic compound of high thermal conductivity. The phosphor layer 31a, which has high thermal conductivity, can enhance the efficiency of heat conduction from the phosphor particles to the substrate 11. This can avoid the phosphor layer 31a from burning and damage resulting from heat.

The inorganic binder (first binder) is mainly composed of an inorganic compound. The inorganic binder preferably has a skeleton made of inorganic material. The inorganic binder can be composed of a sintered compact of inorganic particles for instance. The inorganic binder is preferably composed of a sintered compact of inorganic materials that are transparent to light, such as alumina or silica.

The first binder may envelope a gap or may not contain a gap.

The phosphor layer 31a preferably contains the phosphor particles at about 50 to 75% of the phosphor layer 31a by volume.

The phosphor particles preferably have, on average, a particle diameter $D_{50}$ of about 10 to 30 μm. The phosphor particles are preferably Ce-doped YAG phosphors.

The phosphor layer 31a preferably has a thickness of 20 to 100 μm.

Bonding Layer

The bonding layer 32a is composed of a second binder containing an organic compound. The bonding layer 32a connects the second surface of the phosphor layer 31a and a surface of the substrate 11 together to keep the phosphor layer 31a in intimate contact with the substrate 11, which is the lower layer. To further enhance the adhesion to the substrate 11, the bonding layer 32a preferably covers the phosphor layer 31a so as to face the entire second surface and entire side surfaces of the phosphor layer 31a.

The organic binder (second binder) is mainly composed of an organic compound. The organic binder preferably has a skeleton made of organic material. The organic binder preferably contains, for instance, resin that forms the skeleton. The organic compound within the second binder (organic binder) is preferably a transparent organic compound, such as silicone resin.

The distance in a thickness direction from the second surface of the phosphor layer 31a to the top of the bonding layer 32a is preferably 1 to 10 μm. In addition, the distance from the contact between each side surface of the phosphor layer 31a and the substrate 11 to the lateral distal end of the bonding layer 32a is preferably 10 to 20 μm. This can sufficiently bring the phosphor layer 31a into intimate contact with the substrate 11.

Second Embodiment

Another embodiment of the present invention will be described. For convenience in description, components having the same functions as those described in the foregoing embodiment will be denoted by the same signs and will not be elaborated upon.

Configuration of Optical Elements 101b to 101f

Figure 4A:
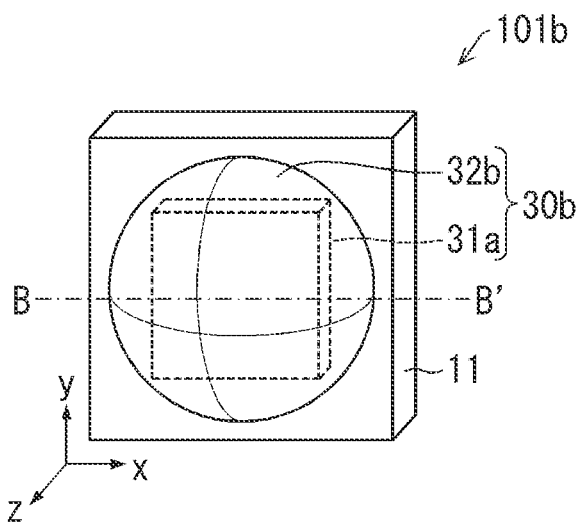
FIG. 4A is a perspective view of the configuration of an optical element according to a second embodiment of the present invention.
Figure 4B:
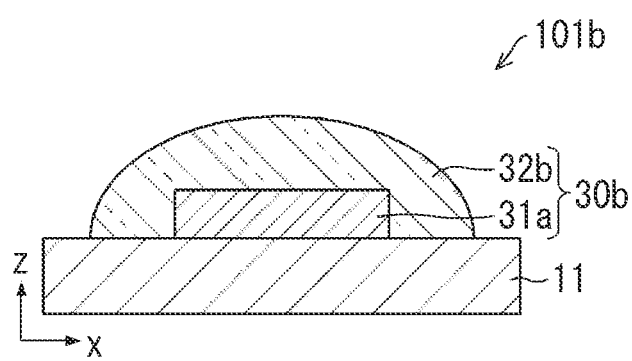
FIG. 4B is a sectional view of the configuration of the optical element according to the second embodiment of the present invention, taken along line B-B'.
Figure 4C:
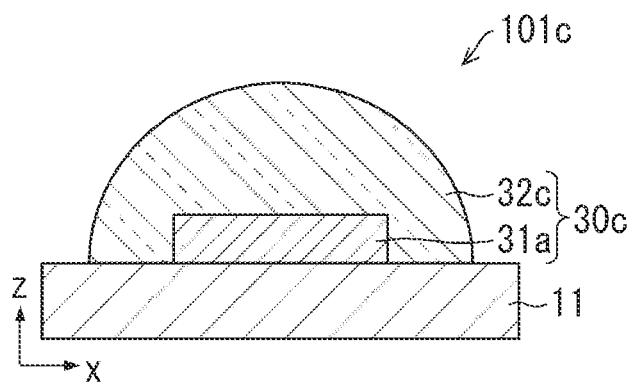
FIG. 4C is a sectional view of the configuration of an optical element according to a modification of the second embodiment of the present invention.
Figure 4D:
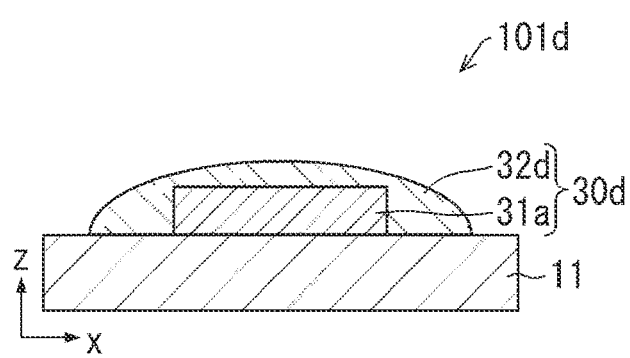
FIG. 4D is a sectional view of the configuration of an optical element according to a modification of the second embodiment of the present invention.
Figure 4E:
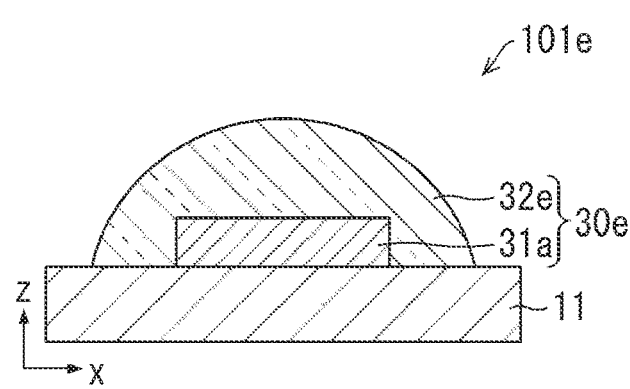
FIG. 4E is a sectional view of the configuration of an optical element according to a modification of the second embodiment of the present invention.
Figure 4F:
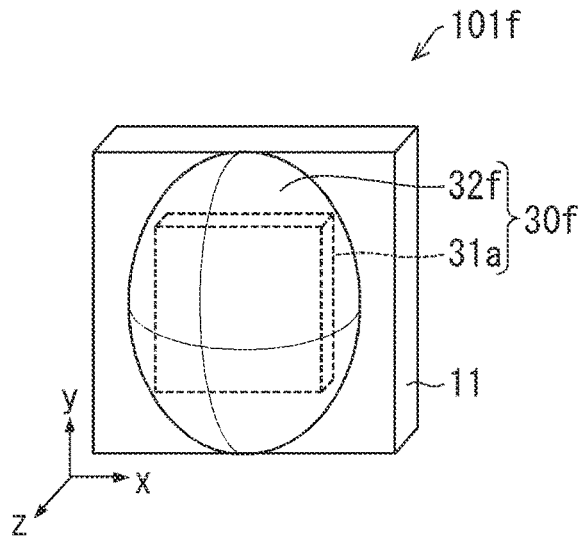
FIG. 4F is a perspective view of the configuration of an optical element according to a modification of the second embodiment of the present invention.

FIG. 4A is a perspective view of the configuration of an optical element 101b according to the second embodiment of the present invention. FIG. 4B is a sectional view (x-z plane) of the configuration of the optical element 101b according to the second embodiment of the present invention, taken along line B-B'. FIGS. 4C to 4E are sectional views (x-z plane) of the configurations of the optical elements 101c to 101e according to modifications of the second embodiment of the present invention. FIG. 4F is a perspective view of the configuration of an optical element 101f according to a modification of the second embodiment of the present invention. The optical element 101b according to this embodiment includes a wavelength converting portion 30b having a bonding layer 32b. The bonding layer 32b is different in shape from the bonding layer 32a, which is included in the wavelength converting portion 30a of the optical element 101a according to the first embodiment of the present invention. Specifically, the bonding layer 32b has an outer surface that is not in intimate contact with the substrate 11 (lower layer) and phosphor layer 31a. The outer surface is curved to form a protrusion. In this configuration, excitation light incident from the outer surface of the bonding layer 32b concentrates on the phosphor layer 31a; for beams of excitation light having the same width, the configuration can offer a smaller irradiation spot than a configuration where the bonding layer 32b has a flat outer surface. This can improve luminous brightness and reduce light that wholly reflects on the outer surface of the bonding layer 32b, when compared to the configuration where the bonding layer 32b has a flat outer surface. Consequently, fluorescence radiating outside the optical element 101b can be increased. In addition, fluorescence radiated from the phosphor layer 31a, when radiating out of the bonding layer 32b of the wavelength converting portion 30b, is refracted in a direction where an angle with respect to the z-axis is smaller. This improves the luminous brightness of the phosphor layer 31a viewed from the z-axis direction.

The foregoing curved surface forming a protrusion has a curved shape forming a protrusion in a sectional view (x-z plane). Examples of such a curved shape include the following: the arc of a semi-ellipse, like the bonding layer 32b of the wavelength converting portion 30b illustrated in FIG. 4B; the arc of a semi-circle, like a bonding layer 32c of a wavelength converting portion 30c illustrated in FIG. 4C; a part of the arc of a semi-ellipse, like a bonding layer 32d of a wavelength converting portion 30d illustrated in FIG. 4D; and a part of the arc of a semi-ellipse, like a bonding layer 32e of a wavelength converting portion 30e illustrated in FIG. 4E. Alternatively, the curved surface may have a curved shape forming a protrusion and having in-plane anisotropy, like a bonding layer 32f of a wavelength converting portion 30f illustrated in FIG. 4F.

The raw material of the bonding layer 32b preferably has a viscosity at which the outer surface of the bonding layer 32b can be formed into a curved shape forming a protrusion. To be specific, the raw material of the bonding layer 32b preferably has, at 23° C., a viscosity of 1000 mPa·s to 10000 Pa·s. Applying a raw material having such a viscosity over a phosphor layer using a constant-ejection apparatus enables the outer surface of the bonding layer 32b to be formed into a curved shape forming a protrusion.

Third Embodiment

Further another embodiment of the present invention will be described. For convenience in description, components having the same functions as those described in the foregoing embodiments will be denoted by the same signs and will not be elaborated upon.

Configuration of High-Output Optical Elements 101g to 101j

Figure 5A:
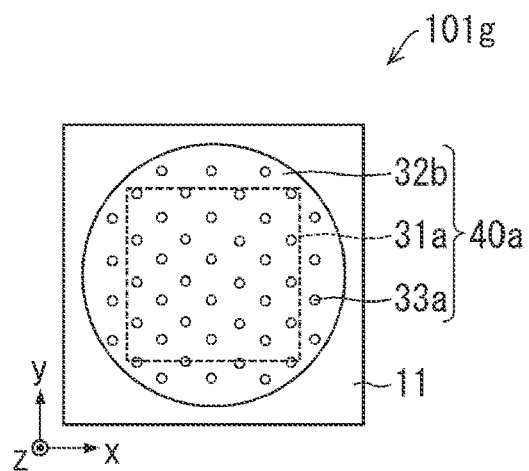
FIG. 5A is a plan view of the configuration of an optical element according to a third embodiment of the present invention.
Figure 5B:
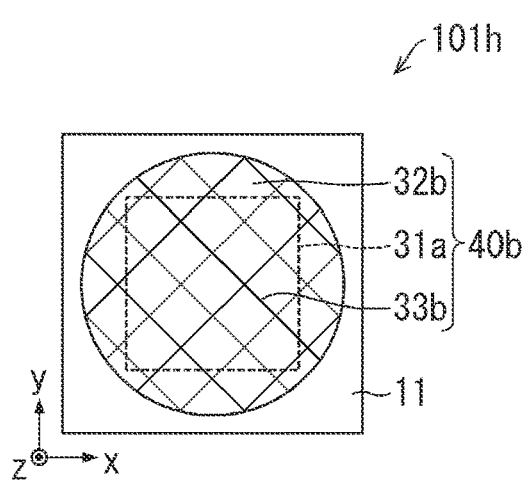
FIG. 5B is a plan view of a configuration according to a modification of the third embodiment of the present invention.
Figure 5C:
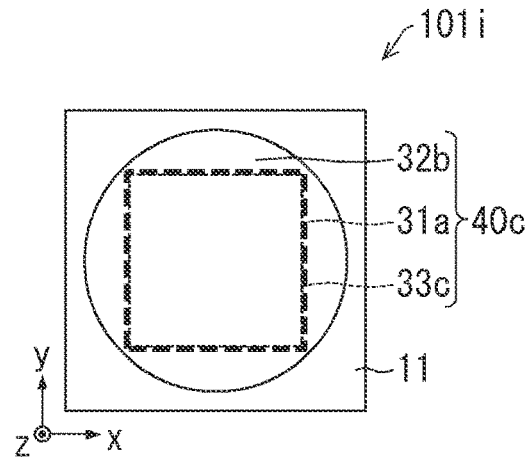
FIG. 5C is a plan view of a configuration according to a modification of the third embodiment of the present invention.
Figure 5D:
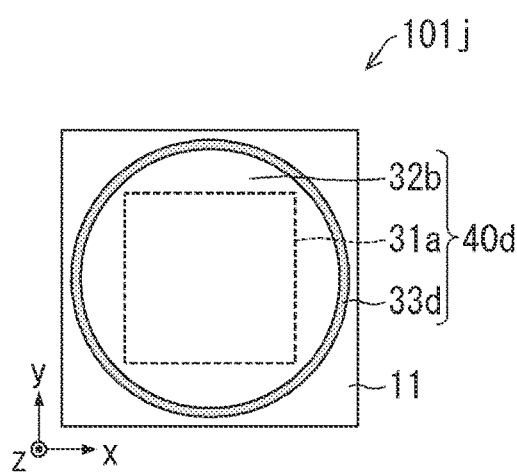
FIG. 5D is a plan view of a configuration according to a modification of the third embodiment of the present invention.

FIG. 5A is a plan view of the configuration of an optical element according to the third embodiment of the present invention. FIGS. 5B to 5D are plan views of configurations according to modifications of the third embodiment of the present invention. Wavelength converting portions 40a to 40d of high-output optical elements 101g to 101j according to this embodiment are different from the wavelength converting portion 30b of the optical element 101b according to the second embodiment of the present invention. Specifically, the wavelength converting portions 40a to 40d further include, in addition to the phosphor layer 31a and bonding layer 32b, low-refractive-index members 33a to 33d, respectively.

The wavelength converting portions 40a to 40d respectively include the low-refractive-index members 33a to 33d each having a lower refractive index than the bonding layer 32b. In this configuration, fluorescence guided outside regions irradiated with excitation light in the respective high-output optical elements 101g to 101j is reflected by the low-refractive-index members 33a to 33d. This enables fluorescence to be taken out only near a spot of excitation light irradiation. As a result, much light is emitted in the same region, thereby achieving a higher-brightness optical element in the z-axis direction.

The term "spot of excitation light irradiation" herein refers to a surface irradiated with the excitation light 14 in the outer surface of the bonding layer 32b. The term "region irradiated with excitation light" herein refers to a region irradiated with the excitation light 14 in the bonding layer 32b. That is, the "region irradiated with excitation light" refers to a region extending from the spot of excitation light irradiation to a surface irradiated with the excitation light 14 in the contact surface between the bonding layer 32b and phosphor layer 31a.

It is preferable that each wavelength converting portion includes, at least partly in its thickness direction, a low-refractive-index member instead of a phosphor layer and bonding layer. It is more preferable that the low-refractive-index member, provided instead of the phosphor layer and bonding layer, be lower than a stack of the phosphor layer and bonding layer replaced. Such a configuration can achieve adhesion and the foregoing effect.

Examples of the shape of the low-refractive-index members when the optical elements are viewed from the z-axis direction include a dot shape illustrated in FIG. 5A, a slit shape illustrated in FIG. 5B, a shape surrounding the perimeter of the phosphor layer 31a illustrated in FIG. 5C, and a shape surrounding the perimeter of the bonding layer 32b illustrated in FIG. 5D.

The low-refractive-index members 33a to 33d are preferably composed of air. This configuration enables a high-output optical element to be manufactured at lower cost.

Fourth Embodiment

Still further another embodiment of the present invention will be described. For convenience in description, components having the same functions as those described in the foregoing embodiments will be denoted by the same signs and will not be elaborated upon.

Configuration of Optical Element 101k

Figure 6A:
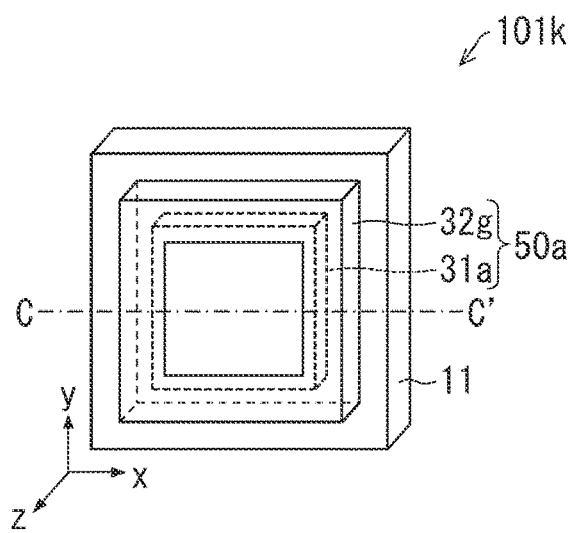
FIG. 6A is a perspective view of the configuration of an optical element according to a fourth embodiment of the present invention.
Figure 6B:
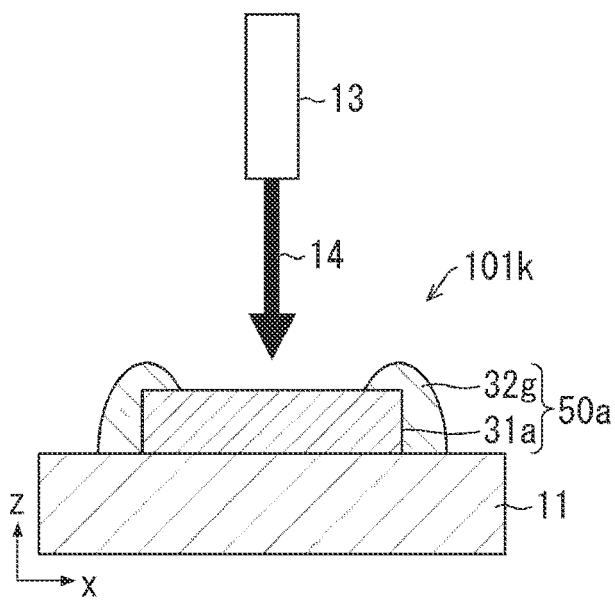
FIG. 6B is a sectional view of the configuration of the optical element according to the fourth embodiment of the present invention, taken along line C-C'.

FIG. 6A is a perspective view of the configuration of an optical element 101k according to the fourth embodiment of the present invention. In this embodiment, a coordinate axis is defined with the main surface of the substrate 11 being an x-y plane. FIG. 6B is a sectional view (x-z plane) of the configuration of the optical element 101k according to the fourth embodiment of the present invention, taken along line C-C'. The optical element 101k according to this embodiment includes a bonding layer, the configuration of which is different from that of the bonding layer included in the optical element 101a shown in FIG. 3.

The optical element 101k according to this embodiment includes a wavelength converting portion 50a. As illustrated in FIGS. 6A and 6B, the wavelength converting portion 50a includes the phosphor layer 31a facing the substrate 11, and a bonding layer 32g keeping the phosphor layer 31a in intimate contact with the substrate 11. The bonding layer 32g connects together the second surface of the phosphor layer 31a, the side surfaces of the phosphor layer 31a, and a surface of the substrate 11 to keep the phosphor layer 31a in intimate contact with the substrate 11. In this embodiment, the second surface is partly exposed from the bonding layer 32g.

The second surface of the phosphor layer 31a is partly exposed in this embodiment; thus, no organic binder is in a region irradiated with the excitation light 14, that is, the phosphor layer 31a has a heating portion separated from an organic binder. This can avoid the phosphor layer 31a from burning and damage due to heat with more certainty, even when the wavelength converting portion 50a is irradiated with the excitation light 14 at particularly high energy density and high intensity from the light source 13, which is composed of a laser or LED for instance.

In addition, light radiated from the phosphor layer 31a exits without passing through the organic binder and is thus not guided within the organic binder. This can prevent brightness reduction due to the enlargement of the size of a luminous spot.

Fifth Embodiment

Still yet another embodiment of the present invention will be described. For convenience in description, components having the same functions as those described in the foregoing embodiments will be denoted by the same signs and will not be elaborated upon.

Configuration of Fluorescent Wheel 102a

Figure 7A:
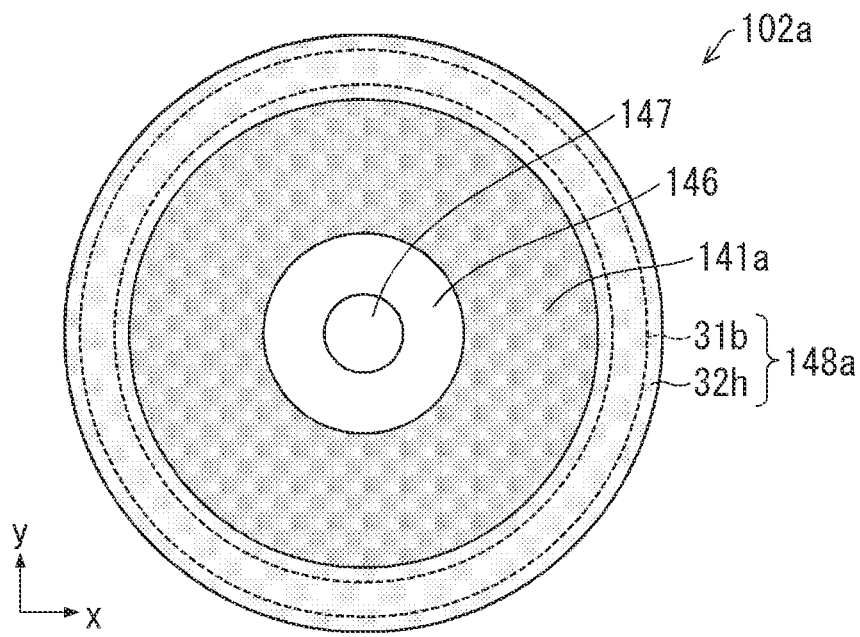
FIG. 7A is a plan view of the configuration of a fluorescent wheel according to a fifth embodiment of the present invention.
Figure 7B:
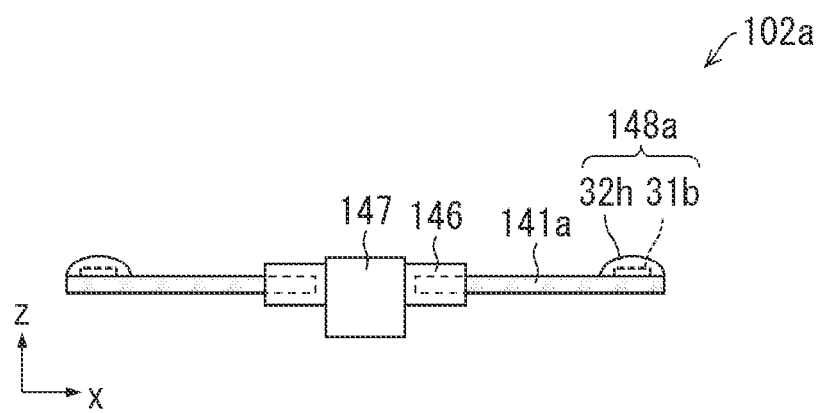
FIG. 7B is a side view of the configuration of the fluorescent wheel according to the fifth embodiment of the present invention.

FIG. 7A is a plan view (x-y plane) of the configuration of a fluorescent wheel 102a, which is an optical element, according to the fifth embodiment of the present invention. FIG. 7B is a side view (x-z plane) of the configuration of the fluorescent wheel 102a according to the fifth embodiment of the present invention. The fluorescent wheel 102a according to this embodiment includes a wavelength converting portion 148a having a lower layer that is a wheel 141a. The wavelength converting portion 148a includes a phosphor layer 31b and a bonding layer 32h. The fluorescent wheel 102a is fastened to a rotation shaft 147 of a driver (not shown) by using a wheel fastener 146. The fluorescent wheel 102a according to this embodiment includes the bonding layer 32h the outer surface of which has, in a sectional view in the radius direction of the fluorescent wheel 102a, a curved shape forming a protrusion in the z-axis direction, like the bonding layers 32b to 30f of the optical element 101b (c.f., FIGS. 4A and 4B) according to the second embodiment. In some cases, the fluorescent wheel 102a may include, instead of the bonding layer 32h, a bonding layer the outer surface of which is not curved, like the bonding layer 32a of the optical element 101a (c.f., FIGS. 3A and 3B) according to the first embodiment. Alternatively, the fluorescent wheel 102a may include both a bonding layer the outer surface of which is not curved, and a bonding layer the outer surface of which has a curved shape forming a protrusion. This holds true for sevenths to twelfth embodiments described later on.

In the fluorescent wheel 102a, the wavelength converting portion 148a needs to be disposed in the circumferential direction on at least a part of a surface of the wheel 141a through which excitation light emitted from a light source passes. The wavelength converting portion 148a is preferably disposed on the wheel 141a concentrically, as illustrated in FIG. 7A.

Sixth Embodiment

Still yet further another embodiment of the present invention will be described. For convenience in description, components having the same functions as those described in the foregoing embodiments will be denoted by the same signs and will not be elaborated upon.

Configuration of Fluorescent Wheel 102b

Figure 8A:
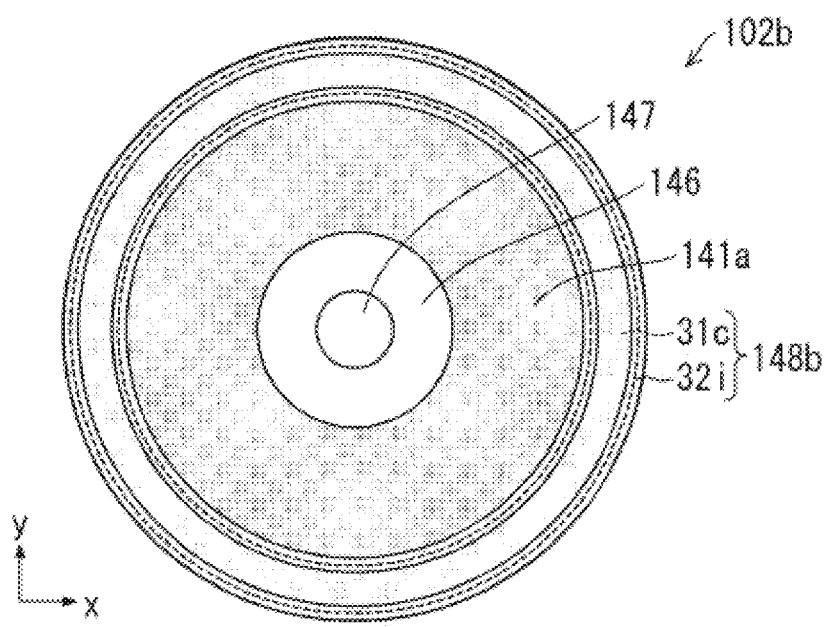
FIG. 8A is a plan view of the configuration of a fluorescent wheel according to a sixth embodiment of the present invention.
Figure 8B:
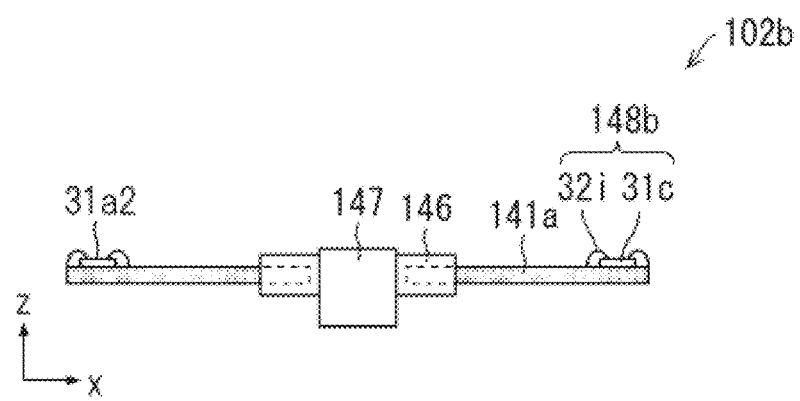
FIG. 8B is a side view of the configuration of the fluorescent wheel according to the sixth embodiment of the present invention.

FIG. 8A is a plan view (x-y plane) of the configuration of a fluorescent wheel 102a, which is an optical element, according to the sixth embodiment of the present invention. FIG. 8B is a side view (x-z plane) of the configuration of the fluorescent wheel 102b according to the sixth embodiment of the present invention. The fluorescent wheel 102b according to this embodiment includes a wavelength converting portion 148b. The wavelength converting portion 148b includes a phosphor layer 31c and a bonding layer 32i. Like the bonding layer 32g of the optical element 101k (c.f., FIGS. 6A and 6B) according to the fourth embodiment, the fluorescent wheel 102b according to this embodiment is configured such that the phosphor layer 31c has a second surface 31a2 that is partly exposed from the bonding layer 32i in a sectional view in the radius direction of the fluorescent wheel 102b.

Seventh Embodiment

Yet another embodiment of the present invention will be described. For convenience in description, components having the same functions as those described in the foregoing embodiments will be denoted by the same signs and will not be elaborated upon.

Configuration of Fluorescent Wheel 102c

Figure 9A:
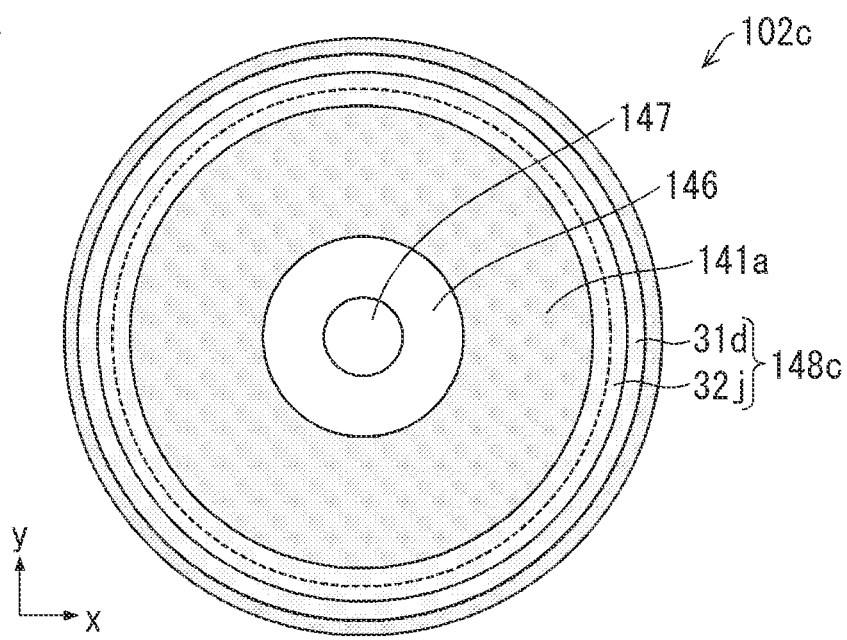
FIG. 9A is a plan view of the configuration of a fluorescent wheel according to a seventh embodiment of the present invention.
Figure 9B:
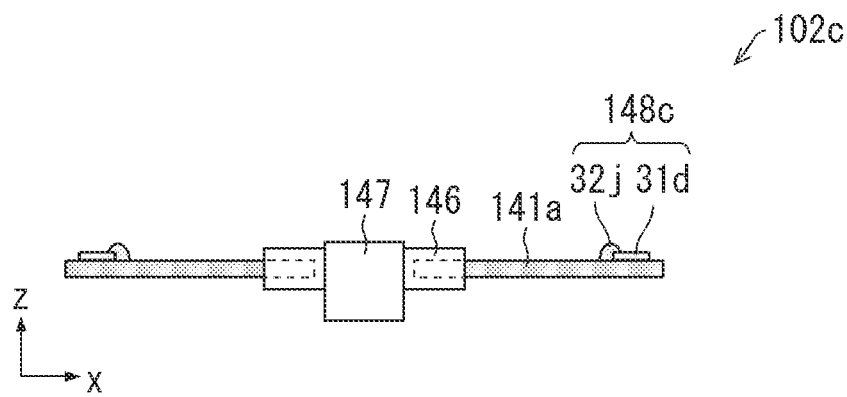
FIG. 9B is a side view of the configuration of the fluorescent wheel according to the seventh embodiment of the present invention.
Figure 9C:
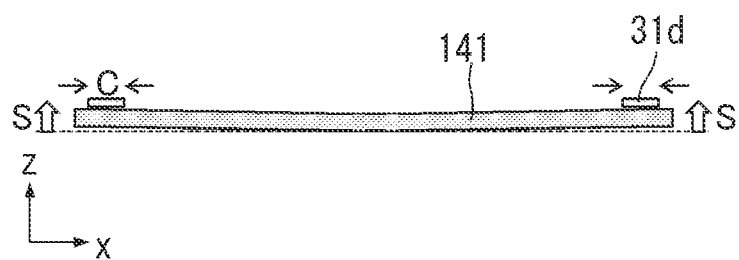
FIG. 9C is a side view of a substrate and phosphor layer with a stress applied to the substrate, which forms the fluorescent wheel according to the seventh embodiment of the present invention.

FIG. 9A is a plan view (x-y plane) of the configuration of a fluorescent wheel 102c, which is an optical element, according to the seventh embodiment of the present invention. FIG. 9B is a side view (x-z plane) of the configuration of the fluorescent wheel 102c according to the seventh embodiment of the present invention. FIG. 9C is a side view of a substrate (metal substrate) 141 and of a phosphor layer 31d with a stress applied to the substrate 141, which forms the wheel 141a of the fluorescent wheel 102c according to the seventh embodiment of the present invention.

The phosphor layer 31d is applied onto the substrate 141 and then baked into any shape, as illustrated in FIG. 9C. During the baking, the volume of the phosphor layer 31d contracts in directions denoted by arrows C, and the phosphor layer 31d solidifies. Accordingly, a stress in a direction denoted by arrows S is applied to the substrate 141, thus forming the surface on which the phosphor layer 31d is disposed into a dented shape. The phosphor layer 31d, which is substantially circular, is easily removed from inside (from near the center of the substrate 141) by this stress.

This embodiment accordingly provides a wavelength converting portion 148c. As illustrated in FIGS. 9A and 9B, the wavelength converting portion 148c includes the phosphor layer 31d of substantially circular shape, and a bonding layer 32j covering only the side surface on the inside (near the center of the wheel 141a) of the phosphor layer 31d and the end of a second surface on the inside of the phosphor layer 31d.

In this embodiment, the bonding layer 32j achieves weight reduction, thereby reducing a balance deviation while the fluorescent wheel 102c is rotating, and reducing a burden on a rotation mechanism composed of the wheel fastener 146, rotation shaft 147, driver, and other components.

Eighth Embodiment

Yet still another embodiment of the present invention will be described. For convenience in description, components having the same functions as those described in the foregoing embodiments will be denoted by the same signs and will not be elaborated upon.

Configuration of Fluorescent Wheels 102d and 102e

Figure 10A:
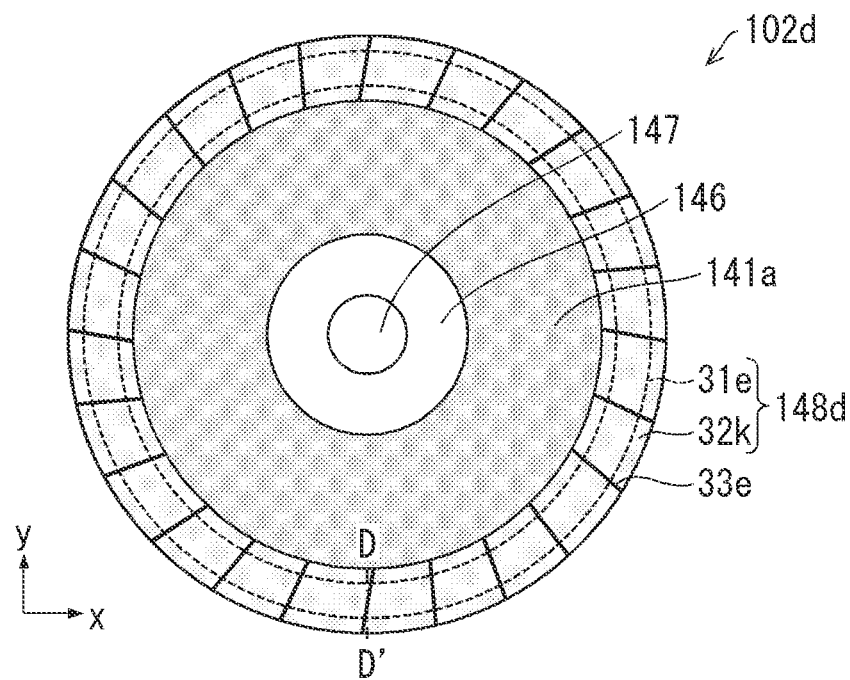
FIG. 10A is a plan view of the configuration of a fluorescent wheel according to an eighth embodiment of the present invention.
Figure 10B:
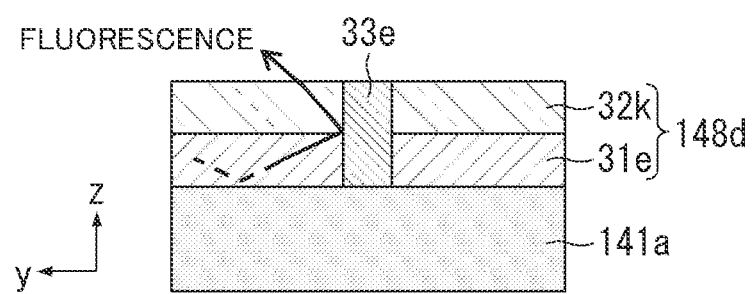
FIG. 10B is a sectional view of the configuration of the fluorescent wheel according to the eighth embodiment of the present invention, taken along line D-D'.
Figure 10C:
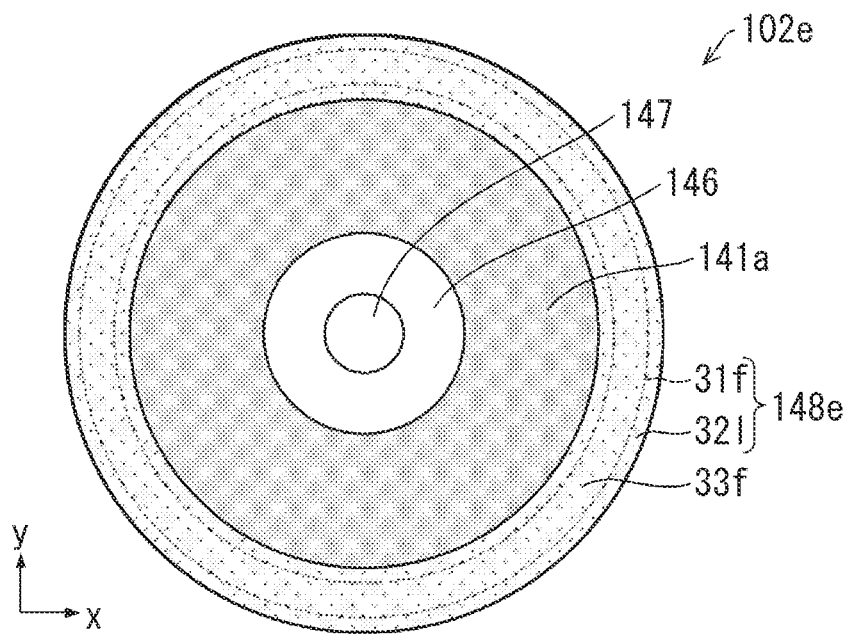
FIG. 10C is a plan view of a configuration according to a modification of the eighth embodiment of the present invention.

FIG. 10A is a plan view (x-y plane) of the configuration of a fluorescent wheel 102d, which is an optical element, according to the eighth embodiment of the present invention. FIG. 10B is a sectional view (y-z plane) of the configuration of the fluorescent wheel according to the eighth embodiment of the present invention, taken along line D-D'. FIG. 10C is a plan view (x-y plane) of the configuration of a fluorescent wheel 102e according to a modification of the eighth embodiment of the present invention.

A low-refractive-index member 33e has a lower refractive index than a bonding layer 32k and can reflect fluorescence. To be specific, the fluorescent wheel 102d includes the low-refractive-index member 33e disposed in a part of a region where a wavelength converting portion 148d is disposed in the circumferential direction on a surface of the wheel 141a. This member is provided instead of a phosphor layer 31e and the bonding layer 32k, which constitute the wavelength converting portion 148d. The fluorescent wheel 102d is configured such that the wavelength converting portion 148d is disposed all around the surface of the wheel 141a at regular intervals. In a preferred embodiment, the fluorescent wheel 102d is configured such that in the region where the wavelength converting portion 148d is disposed in the circumferential direction on the surface of the wheel 141a, the wavelength converting portion 148d extends in the radius direction on at least a part of the wheel 141a. Further, the fluorescent wheel 102e in FIG. 10C includes a wavelength converting portion 148e disposed in the circumferential direction on the surface of the wheel 141a. The wavelength converting portion 148e includes a phosphor layer 31f and a bonding layer 32l. The fluorescent wheel 102e also includes a low-refractive-index member 33f in the form of dots disposed in a part of a region where the wavelength converting portion 148e is disposed. The low-refractive-index member 33f is provided instead of the phosphor layer 31f and bonding layer 32l.

The following describes the foregoing using polar coordinates. Let the center of the wheel 141a be defined as an origin point (0), let a distance in the radius direction from the origin point be expressed as r, and let an angle of deviation be expressed as θ. Accordingly, the region where the wavelength converting portions 148d and 148e are disposed in the circumferential direction on the surface of the wheel 141a is identified using a set of polar coordinates (r, θ). At this time, the wavelength converting portions 148d and 148e are at least located in a part of a range between the closest point ($r_{min}$, θ) and furthest point ($r_{max}$, θ) indicating the location where the wavelength converting portions 148d and 148e are disposed at any angle of deviation θ. A low-refractive-index member in any form may be provided as long as this configuration is satisfied; for instance, a low-refractive-index member in the form of slits may be provided, like the low-refractive-index member 33e shown in FIG. 10A, or a low-refractive-index member in the form of dots may be provided, like the low-refractive-index member 33f shown in FIG. 10C.

In this configuration, fluorescence guided outside a region irradiated with excitation light in the wheel 141a is reflected by the low-refractive-index members 33e to 33f. This enables fluorescence to be taken out only near a spot of excitation light irradiation. As a result, much light is emitted in the same region, offering a high-brightness fluorescent wheel near the irradiation spot.

In the fluorescent wheel 102d, the low-refractive-index member 33e, provided instead of the phosphor layer 31e and bonding layer 32k, is preferably as high as a stack of the phosphor layer 31e and bonding layer 32k replaced, as illustrated in FIG. 10B. This configuration can further enhance the foregoing effect.

The fluorescent wheel 102d is preferably configured such that the wavelength converting portion 148d is replaced with the low-refractive-index member 33e continuously from the closest point ($r_{min}$, $θ_1$) to the furthest point ($r_{max}$, $θ_2$) along with changes in θ, and such that θ changes from $θ_1$ to $θ_2$ continuously (herein, $θ_1 \neq θ_2$). This configuration can further enhance the foregoing effect.

The low-refractive-index member 33e is preferably composed of air. This configuration enables a fluorescent wheel to be manufactured at lower cost.

The configuration in this embodiment, where a region in which a phosphor layer and a bonding layer are disposed is partly replaced with a low-refractive-index member, is applicable to the fluorescent wheel 102b (c.f., FIGS. 8A and 8B) according to the sixth embodiment, and the fluorescent wheel 102c (c.f., FIGS. 9A and 9B) according to the seventh embodiment.

Ninth to twelfth embodiments of the present invention below will describe optical devices used as, for instance, a light source device, a vehicle headlight, and a projector.

Ninth Embodiment

Yet further another embodiment of the present invention will be described. For convenience in description, components having the same functions as those described in the foregoing embodiments will be denoted by the same signs and will not be elaborated upon.

Configuration of Light Source Device 140

Figure 11A:
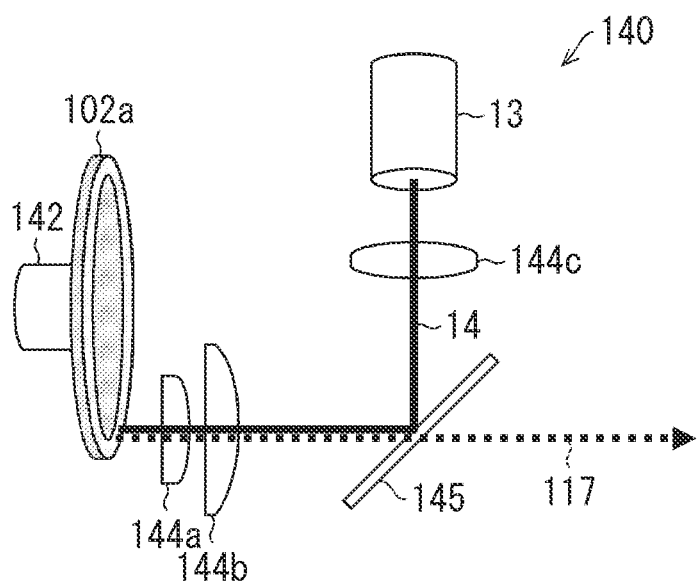
FIG. 11A is a schematic diagram of the configuration of a light source device according to a ninth embodiment of the present invention.
Figure 11B:
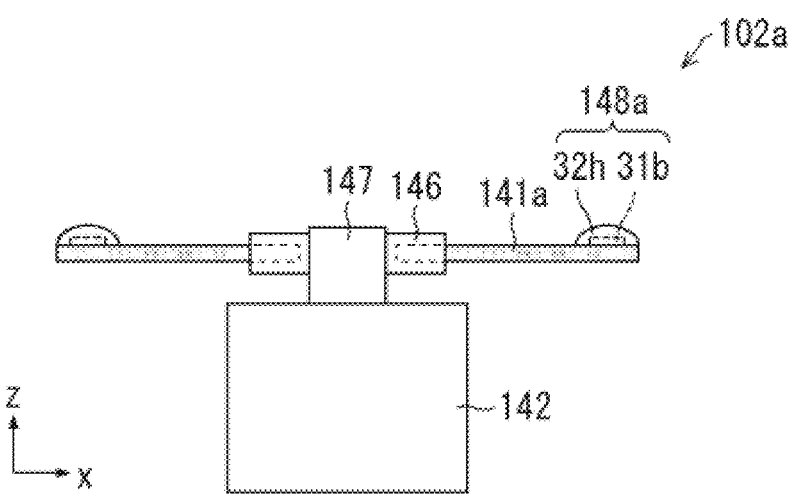
FIG. 11B is a side view of a configuration of a light source module included in the light source device according to the ninth embodiment of the present invention.
Figure 11C:
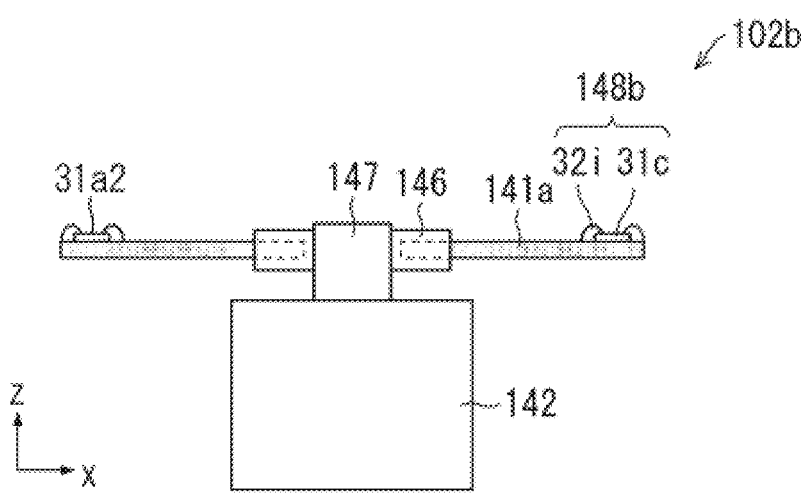
FIG. 11C is a side view of another configuration of the light source module included in the light source device according to the ninth embodiment of the present invention.

FIG. 11A is a schematic diagram of the configuration of a light source device, which is an optical device, according to the ninth embodiment of the present invention. FIG. 11B is a side view (x-z plane) of a configuration of a light source module included in the light source device according to the ninth embodiment of the present invention. FIG. 11C is a side view (x-z plane) of another configuration of the light source module included in the light source device according to the ninth embodiment of the present invention.

The light source device 140 includes the fluorescent wheel 102*a* (c.f., FIGS. 7A and 7B), a driver 142 that rotates the fluorescent wheel 102*a*, and the light source 13 that emits the excitation light 14 to the wavelength converting portion 148*a*. The light source device 140 emits fluorescence 117 when, along with the rotation of the fluorescent wheel 102*a*, the excitation light 14 impinges on the phosphor layer 31*b* of the wavelength converting portion 148*a* disposed in the circumferential direction on at least the surface of the fluorescent wheel 102*a*.

The light source device 140 is preferably used for a projector for instance. The light source 13 of the light source device 140 is preferably a blue laser light source that emits the excitation light 14 having a wavelength for exciting the phosphor layer 31 of the wavelength converting portion 148*a*. In a preferred embodiment, a blue laser diode is used that excites a phosphor, including YAG and LuAG. The excitation light 14 emitted to the phosphor layer 31 of the wavelength converting portion 148*a* can pass through lenses 144*a*, 144*b*, and 144*c* on its optical path. A mirror 145 may be placed on the optical path of the excitation light 14. The mirror 145 is preferably a dichroic mirror.

The fluorescent wheel 102*a* is fastened to the rotation shaft 147 of the driver 142 by using the wheel fastener 146, as illustrated in FIG. 11B. The driver 142 is preferably a motor, and the fluorescent wheel 102*a* fastened to the rotation shaft 147, a motor's rotation shaft, by using the wheel fastener 146 rotates along with motor rotation.

Upon receiving excitation light, the wavelength converting portion 148*a* on the perimeter of the surface of the fluorescent wheel 102*a* radiates the fluorescence 117, which then travels through the mirror 145 to exit. The wavelength converting portion 148*a*, which rotates along with the rotation of the fluorescent wheel 102*a*, radiates the fluorescence 117 while always rotating.

As illustrated in FIG. 11C, the light source module can include the fluorescent wheel 102*b* (c.f., FIGS. 8A and 8B) instead of the fluorescent wheel 102*a* of the light source module shown in FIG. 11B.

Figure 12A:
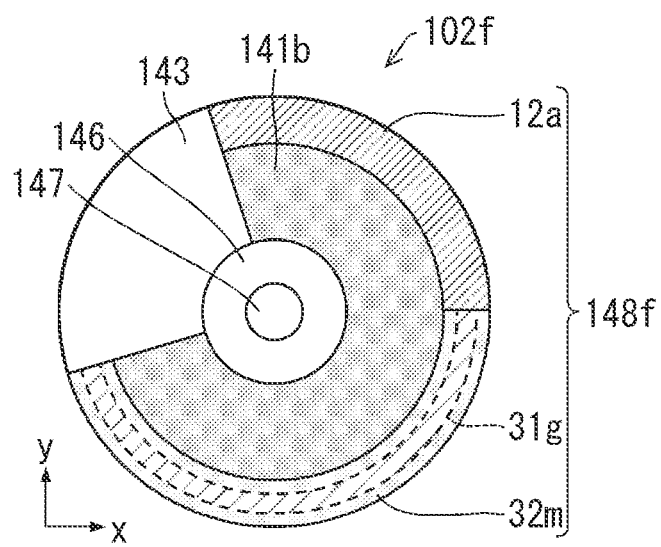
FIG. 12A is a plan view of the configuration of a fluorescent wheel in a modification, included in the light source device according to the ninth embodiment of the present invention.
Figure 12B:
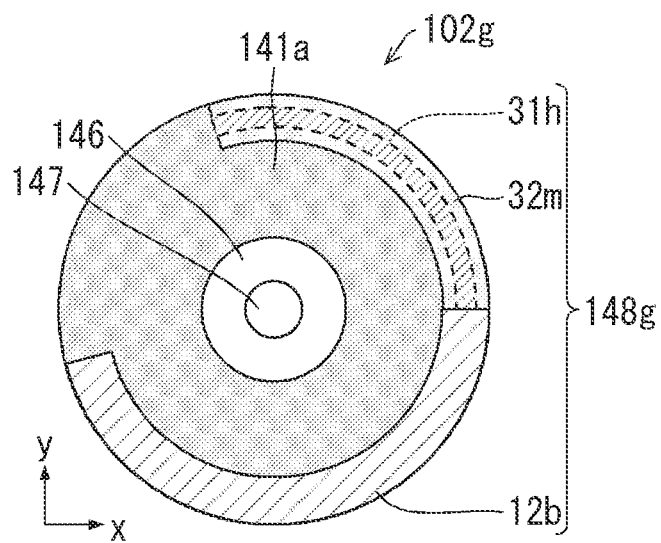
FIG. 12B is a plan view of the configuration of a fluorescent wheel in a modification, included in the light source device according to the ninth embodiment of the present invention.
Figure 12C:
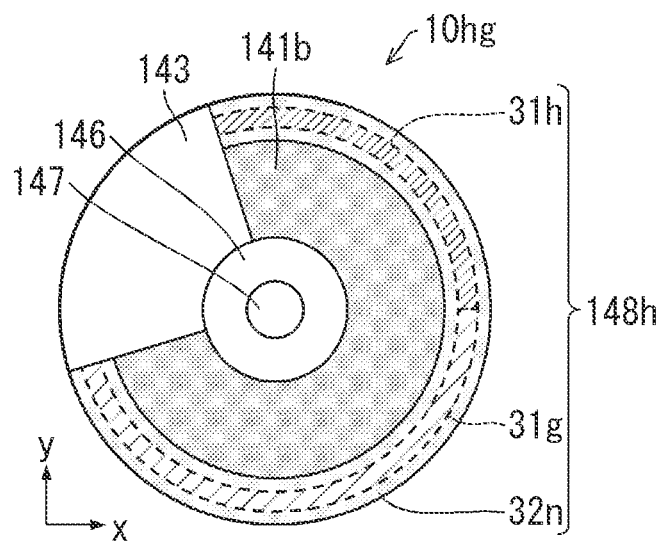
FIG. 12C is a plan view of the configuration of a fluorescent wheel in a modification, included in the light source device according to the ninth embodiment of the present invention.
Figure 12D:
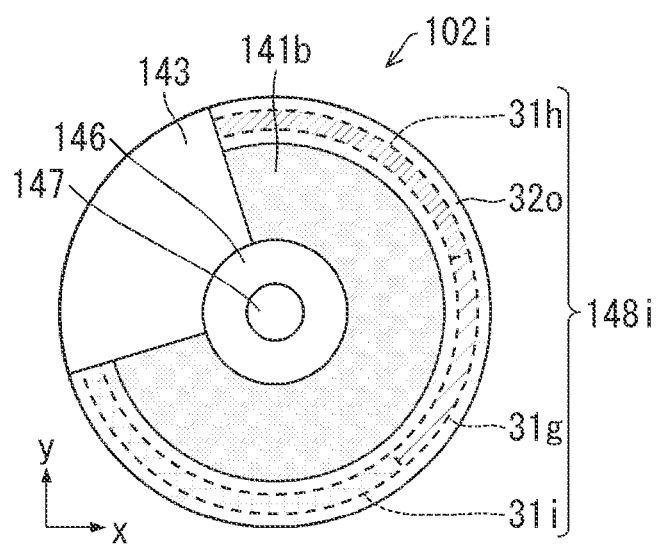
FIG. 12D is a plan view of the configuration of a fluorescent wheel in a modification, included in the light source device according to the ninth embodiment of the present invention.

FIGS. 12A to 12D are plan views (x-y planes) of the configurations of fluorescent wheels 102*f* to 102*i* in modifications, included in the light source device 140 according to the ninth embodiment of the present invention. As illustrated in FIGS. 12A, 12C, and 12D, a usable wheel is a wheel 141*b* having a transmitting portion 143 that allows the excitation light 14 to pass through a part of its segments. In a preferred embodiment, the transmitting portion 143 is made of glass. Such a segment configuration enables a single fluorescent wheel to convert the excitation light 14 into a plurality of wavelengths. As illustrated in FIG. 12A, a fluorescent wheel 102*f* may be used that is divided into a segment including a conventional phosphor layer 12*a* that radiates fluorescence having a wavelength corresponding to green, and a segment including a bonding layer 32*m* and a phosphor layer 31*g* that radiates fluorescence having a wavelength corresponding to yellow. Alternatively, as illustrated in FIG. 12B, a fluorescent wheel 102*g* may be used that is divided into a segment including the bonding layer 32*m* and a phosphor layer 31*h* that radiates fluorescence having a wavelength corresponding to green, and a segment including a conventional phosphor layer 12*b* that radiates fluorescence having a wavelength corresponding to yellow. Alternatively, as illustrated in FIG. 12C, a fluorescent wheel 10*hg* may be used that is divided into the phosphor layer 31*h*, which radiates fluorescence having a wavelength corresponding to green, and the phosphor layer 31*g*, which radiates fluorescence having a wavelength corresponding to yellow. The fluorescent wheel 102*h* includes a bonding layer 32*n* keeping the phosphor layers 31*g* and 31*h* in intimate contact with each other. Alternatively, as illustrated in FIG. 12D, a fluorescent wheel 102*i* may be used that is divided into the phosphor layer 31*h*, which radiates fluorescence having a wavelength corresponding to green, the phosphor layer 31*g*, which radiates fluorescence having a wavelength corresponding to yellow, and a phosphor layer 31*i* that radiates fluorescence having a wavelength corresponding to red. The fluorescent wheel 102*i* includes a bonding layer 32*o* keeping the phosphor layers 31*g*, 31*h*, and 31*i* in intimate contact with one another. Dividing a fluorescent wheel in its circumferential direction into a plurality of segments and coloring the phosphor for each segment individually can maintain external quantum yield at a high level. This can provide various colors while maintaining brightness.

The phosphor layer and bonding layer in each of the fluorescent wheels 102*f* to 102*i* shown in FIGS. 12A to 12D may be the phosphor layer and bonding layer shown in FIG. 11B, or the phosphor layer and bonding layer shown in FIG. 11C.

Tenth Embodiment

Yet still further another embodiment of the present invention will be described. For convenience in description, components having the same functions as those described in the foregoing embodiments will be denoted by the same signs and will not be elaborated upon.

Configuration of Light Source Device 80

Figure 13:
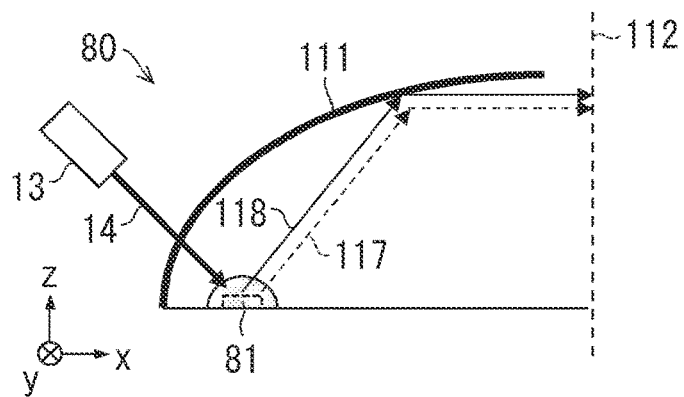
FIG. 13 is a schematic diagram of the configuration of a light source device according to a tenth embodiment of the present invention.

FIG. 13 is a schematic diagram of the configuration of a light source device 80, which is an optical device, according to the tenth embodiment of the present invention. The light source device 80 includes the following: an optical element 81 including a phosphor layer and a bonding layer; the light source 13 that emits the excitation light 14 to the optical element 81; and a reflector 111 having a reflective surface that reflects the fluorescence 117 radiated from the optical element 81. The reflective surface of the reflector 111 has a shape such that beams of incident light are reflected so as to exit in parallel in a predetermined direction.

The light source device 80 is preferably a reflective vehicle headlight (laser headlight). The light source 13 is preferably a blue laser light source that emits the excitation light 14 having a wavelength for exciting a phosphor layer of the optical element 81. The reflector 111 is preferably composed of a semi-paraboloid mirror. It is preferable that a paraboloid be longitudinally divided in parallel with the x-y plane into two to form a semi-paraboloid, and that its inner surface be a mirror. The reflector 111 has a hole through which the excitation light 14 passes. The optical element 81 is excited by the excitation light 14 of blue, and radiates the fluorescence 117 of a long-wavelength band (yellow wavelength) of visible light. The excitation light 14 is reflected on the surface of the optical element 81 to become diffused reflected light 118. The optical element 81 is placed in a location of the focal point of the paraboloid. The optical element 81 is placed in the location of the focal point of the paraboloid mirror; accordingly, the fluorescence 117 and diffused reflected light 118 from the optical element 81 travels to the reflector 111 and reflects on the reflector surface to thus go straight uniformly to an outgoing surface 112. White light consisting of a mixture of the fluorescence 117 and diffused reflected light 118 exits from the outgoing surface 112 as parallel light beams.

In the tenth embodiment, the optical elements 101a to 101k according to the first to fourth embodiments can be used as the optical element 81.

Eleventh Embodiment

Still another embodiment of the present invention will be described. For convenience in description, components having the same functions as those described in the foregoing embodiments will be denoted by the same signs and will not be elaborated upon.

Configuration of Light Source Device 90

Figure 14:
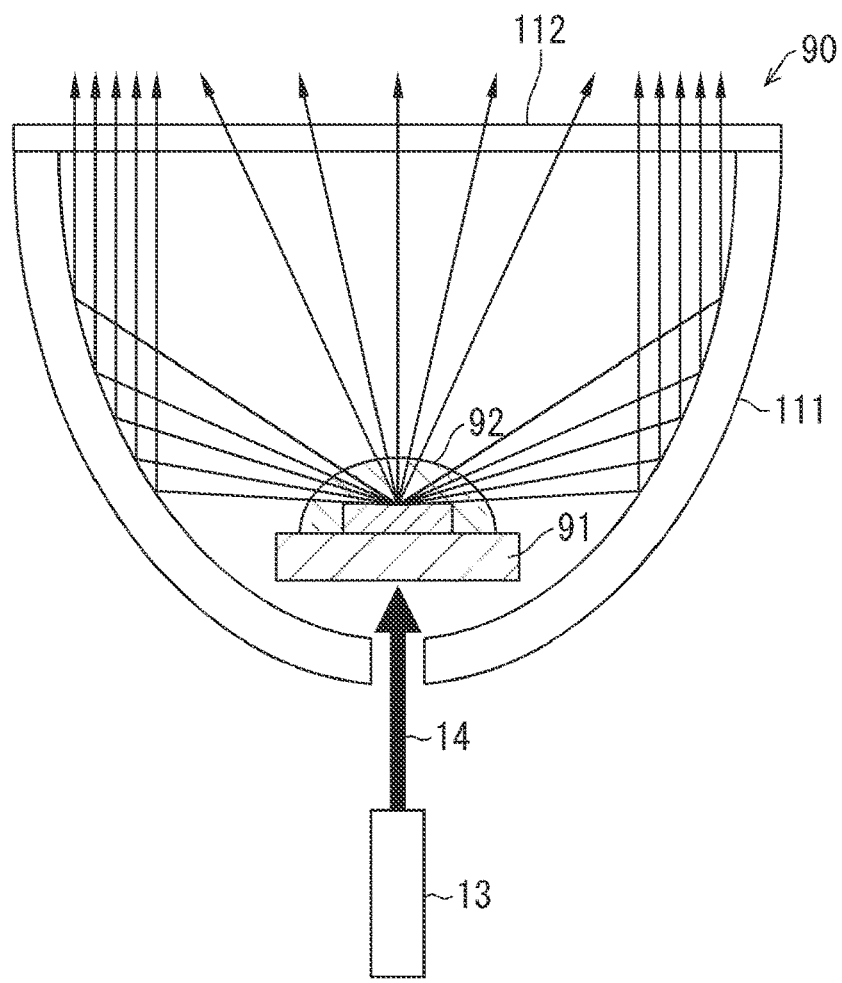
FIG. 14 is a schematic diagram of the configuration of a light source device according to an eleventh embodiment of the present invention.

FIG. 14 is a schematic diagram of the configuration of a light source device 90, which is an optical device, according to the eleventh embodiment of the present invention. The light source device 90 includes an optical element 92, and the light source 13 that emits the excitation light 14 to the optical element 92. The light source 13 emits the excitation light 14 to a first surface via a permeable substrate 91. A phosphor layer radiates fluorescence from its second surface. Light reflected on the reflector 111 exits from the outgoing surface 112 as parallel light beams.

In the eleventh embodiment of the present invention, the permeable substrate 91 preferably has a heatsink structure. In another preferred embodiment, fastening the permeable substrate 91 to a permeable heatsink (not shown) to establish contact therebetween can cool the permeable substrate 91.

The light source device 90 is preferably mounted on a permeable laser headlight (vehicle headlight), as disclosed in Patent Literature 2 (International Publication No. 2014/203484). As disclosed in Patent Literature 3 (Japanese Patent Application Laid-Open No. 2012-119193), it is known that a permeable heatsink substrate with a phosphor film deposited thereon exerts high thermal dissipation on its side provided with a heatsink, when excitation light comes from the heatsink.

In the eleventh embodiment, the optical elements 101a to 101k according to the first to fourth embodiments can be used as the optical element 92.

Twelveth Embodiment

Yet another embodiment of the present invention will be described. For convenience in description, components having the same functions as those described in the foregoing embodiments will be denoted by the same signs and will not be elaborated upon.

Configuration of Projector

Figure 15:
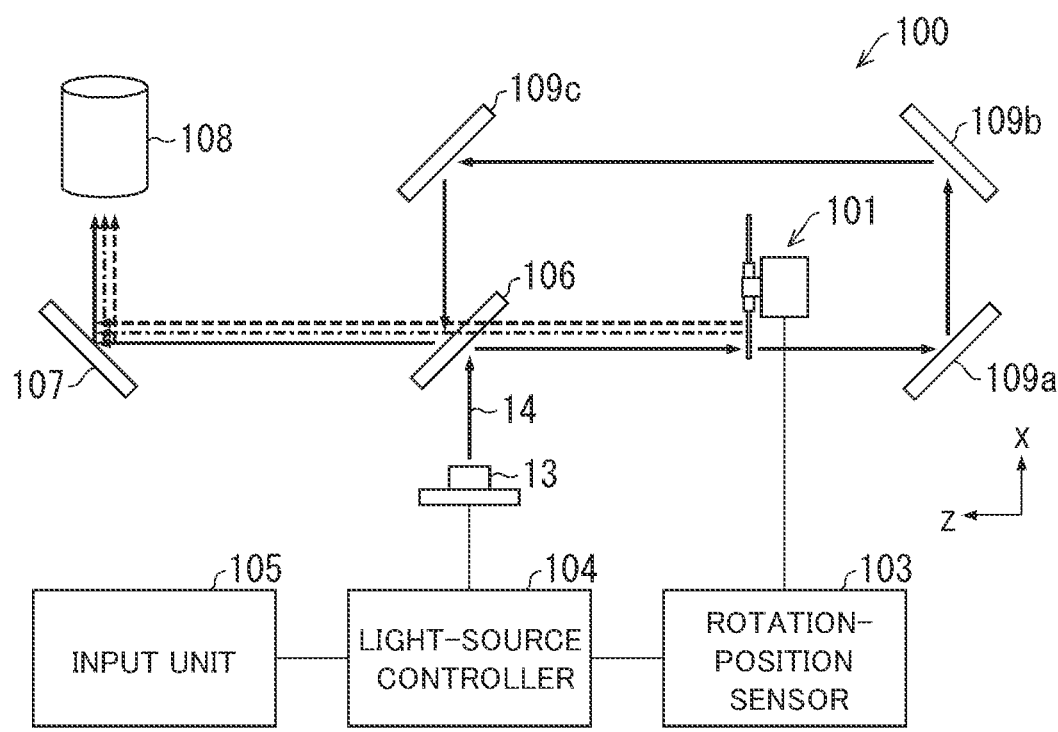
FIG. 15 is a schematic diagram of the configuration of a projector according to a twelfth embodiment of the present invention.

FIG. 15 is a schematic diagram of the configuration of a projector, which is an optical device, according to the twelfth embodiment of the present invention. A projector 100 includes the following: a light source device; a rotation-position sensor 103 that acquires a position of rotation of a fluorescent wheel; a light-source controller 104 that controls the light source 13 in accordance with information sent from the rotation-position sensor 103; a display element 107; a light-source optical system 106 that guides, to the display element 107, light emitted from the light source device; and a projection optical system 108 that projects projection light emitted from the display element 107 onto a screen. The projector 100 controls an output of the light source 13 in accordance with information about the position of rotation of the fluorescent wheel acquired by the rotation-position sensor 103. The light source device needs to include, in at least a part of a location in a circumferential direction where excitation light from the light source 13 passes, a fluorescent wheel divided into a plurality of segments each including an optical element extending in the circumferential direction. The light source device 140 may be used.

When the transmitting portion 143 is placed in a part of the segments of the fluorescent wheel 102i, as illustrated in FIG. 12D for instance, the excitation light 14 of blue passes through the fluorescent wheel 102i via the transmitting portion 143. The excitation light 14 emitted to a wavelength converting portion 148i can go, on its optical path, through mirrors 109a to 109c and the light-source optical system 106. The light-source optical system 106 is preferably a dichroic mirror. A preferable dichroic mirror allows blue light incident at 45 degrees to reflect, and allows red and green light to pass through.

To be more specific, the light-source optical system 106 that includes a dichroic mirror having this optical property reflects, toward the fluorescent wheel 102i, the excitation light 14 of blue impinging on the dichroic mirror. The blue light passes through the fluorescent wheel 102i via the transmitting portion 143 with the timing of rotation of the fluorescent wheel 102i. With the timing of rotation of the fluorescent wheel 102i, the excitation light 14 emitted to the segments other than the segment including the transmitting portion 143 is radiated to the wavelength converting portion 148i to cause the phosphor layers 31g to 31i to radiate fluorescence. For each segment, the phosphor layer 31h radiates fluorescence of a green wavelength band, the phosphor layer 31g radiates fluorescence of a yellow wavelength band, and the phosphor layer 31i radiates fluorescence of a red wavelength band. The radiated fluorescence of green, yellow, and red passes through the dichroic mirror to impinge on the display element 107. The blue light passing through the transmitting portion 143 impinges again on the dichroic mirror via the mirrors 109a to 109c, and is again reflected on the dichroic mirror to impinge on the display element 107.

In a preferred embodiment, a projection apparatus (projector 100) can include a light source module 101, the display element 107, the light-source optical system 106 (dichroic mirror), and the projection optical system 108. Examples of the light source module 101 usable herein include a light source module including the fluorescent wheel 102a and driver 142 shown in FIG. 11B, and a light source module including the fluorescent wheel 102b and driver 142 shown in FIG. 11C. The light-source optical system 106 (dichroic mirror) can guide light emitted from the light source module 101 to the display element 107, and the projection optical system 108 can project projection light emitted from the display element 107 onto a screen or other things. In a preferred embodiment, the display element 107 is a digital mirror device (DMD). The projection optical system 108 is preferably in combination with a projection lens.

Summary

An optical element according to a first aspect of the present invention includes a phosphor layer (31a to 31i) facing a lower layer (11), and a bonding layer (32a to 32o) keeping the phosphor layer (31a to 31i) in intimate contact with the lower layer (11). The phosphor layer (31a to 31i) includes an inorganic binder, and phosphor particles dispersed within the inorganic binder. The bonding layer (32a to 32o) includes an organic binder. The phosphor layer (31a to 31i) has a first surface facing the lower layer (11), a second surface opposite to the first surface, and a side surface connecting the first and second surfaces together. The bonding layer (32a to 32o) connects together the second surface, the side surface, and a surface of the lower layer to keep the phosphor layer (31a to 31i) in intimate contact with the lower layer (11).

In the first aspect, the optical element according to a second aspect of the present invention may be configured such that the lower layer (11) is composed of one or more layers including a substrate.

In the first or second aspect, the optical element according to a third aspect of the present invention may be configured such that the bonding layer (32a to 32o) covers the entire second surface.

In the first or second aspect, the optical element according to a fourth aspect of the present invention may be configured such that the bonding layer (32a to 32o) covers the phosphor layer (31a to 31i) so as to face the entire second surface and the entire side surface.

In any of the first to fourth aspects, the optical element according to a fifth aspect of the present invention may be configured such that the bonding layer (32a to 32o) has an outer surface that is not in intimate contact with the lower layer (11) and the phosphor layer (31a to 31i), and such that the outer surface of the bonding layer (32a to 32o) has a curved shape forming a protrusion.

In the first or second aspect, the optical element according to a sixth aspect of the present invention may be configured such that the second surface is partly exposed from the bonding layer (32a to 32o).

In any of the first to sixth aspects, the optical element according to a seventh aspect of the present invention may be configured such that the lower layer (11) is a wheel (141a, 141b), and that the phosphor layer (31a to 31i) and the bonding layer (32a to 32o) are disposed in a circumferential direction on at least a part of a surface of the wheel (141a, 141b) through which excitation light emitted from a light source passes.

In the seventh aspect, the optical element according to an eighth aspect of the present invention may be configured such that the bonding layer (32a to 32o) covers only the side surface inside the phosphor layer (31a to 31i) and an end of the second surface inside the phosphor layer (31a to 31i).

In the seventh aspect, the optical element according to a ninth aspect of the present invention may be configured such that a low-refractive-index member (33a to 33f) is disposed in a part of a region where the phosphor layer (31a to 31i) and the bonding layer (32a to 32o) are disposed in the circumferential direction on the surface of the wheel (141a, 141b). The low-refractive-index member has a lower refractive index than the bonding layer (32a to 32o). In the region where the phosphor layer (31a to 31i) and the bonding layer (32a to 32o) are disposed in the circumferential direction on the surface of the wheel, the phosphor layer (31a to 31i) and the bonding layer (32a to 32o) may extend in a radius direction on at least a part of the wheel (141a, 141b).

In the ninth aspect, the optical element according to a tenth aspect of the present invention may be configured such that the low-refractive-index member (33a to 33f) provided instead of the phosphor layer (31a to 31i) and the bonding layer (32a to 32o) is as high as a stack of the phosphor layer replaced and the bonding layer replaced.

In the ninth or tenth aspect, the optical element according to an eleventh aspect of the present invention may be configured such that a region where the optical element is disposed in the circumferential direction on the surface of the wheel (141a, 141b) is identified using a set of polar coordinates (r, θ), where an origin point (0) is the center of the wheel (141a, 141b), where r denotes a distance in the radius direction from the origin point, where θ denotes an angle of deviation. The phosphor layer (31a to 31i) and the bonding layer (32a to 32o) may be replaced with the low-refractive-index member (33a to 33f) continuously from the closest point ($r_{min}$, $\theta_1$) to the furthest point ($r_{max}$, $\theta_2$) along with a change in θ. In addition, θ may change from $\theta_1$ to $\theta_2$ continuously, where $\theta_1 \neq \theta_2$ is satisfied.

In any of the ninth to eleventh aspects, the optical element according to a twelfth aspect of the present invention may be configured such that the low-refractive-index member (33a to 33f) is composed of air.

An optical device according to a thirteenth aspect of the present invention may include the optical element according to any of the first to twelfth aspects, and a laser or LED that emits excitation light to the phosphor layer (31a to 31i).

An optical device according to a fourteenth aspect of the present invention may include the optical element according to any of the seventh to twelfth aspects, a driver (142) that rotates the wheel, and a light source (13) that emits excitation light to the optical element. The optical device may radiate fluorescence when, along with the rotation of the wheel, excitation light impinges on the phosphor layer (31a to 31i) of the optical element disposed in the circumferential direction on at least the surface of the wheel.

An optical device according to a fifteenth aspect of the present invention may include the optical element according to any of the first to sixth aspects, a light source (13) that emits excitation light to the optical element, and a reflector (111) having a reflective surface that reflects fluorescence radiated from the optical element.

An optical device according to a sixteenth aspect of the present invention may include the optical element according to any of the first to sixth aspects. The lower layer (11) is a permeable substrate (91). The optical device may also include a light source (13) that emits excitation light to the optical element. The light source (13) may emit excitation light to the first surface via the permeable substrate (91), and the phosphor layer (31a to 31i) may radiate fluorescence from the second surface.

In the fourteenth aspect, the optical device according to a seventeenth aspect of the present invention may include the following; a display element (107); a light-source optical system (106) that guides, to the display element (107), the fluorescence radiated from the phosphor layer; and a projection optical system (108) that projects projection light emitted from the display element (107) onto a screen.

In the fourteenth aspect, the optical device according to an eighteenth aspect of the present invention may be configured such that the phosphor layer (31a to 31i) and the bonding layer (32a to 32o) are disposed in the circumferential direction on at least a part of the surface of the wheel through which excitation light emitted from the light source (13) passes, so as to be divided into a plurality of segments in the circumferential direction. The optical device may further include the following: a rotation-position sensor (103) that acquires a position of rotation of the wheel; a light-source controller (104) that controls the light source (13) in accordance with information sent from the rotation-position sensor (103); a display element (107); a light-source optical system (106) that guides, to the display element (107), light emitted from the light source device; and a projection optical system (108) that projects projection light emitted from the display element (107) onto a screen. The optical device may control an output from the light source (13) in accordance with information about the position of rotation of the wheel acquired by the rotation-position sensor (103).

In any of the first to sixth aspects, the optical element according to a nineteenth aspect of the present invention may further include a low-refractive-index member having a lower refractive index than the bonding layer.

The present invention is not limited to the foregoing embodiments. Various modifications can be devised within the scope of claims. An embodiment obtained in combination, as necessary, with the technical means disclosed in the respective embodiments is also included in the technical scope of the present invention. Furthermore, combining the technical means disclosed in the respective embodiments can provide a new technical feature.

The invention claimed is:

1. An optical element comprising:
a phosphor layer facing a lower layer; and
a bonding layer keeping the phosphor layer in intimate contact with the lower layer,
wherein the phosphor layer includes
an inorganic binder, and
phosphor particles dispersed within the inorganic binder,
the bonding layer includes an organic binder,
the phosphor layer has
a first surface facing the lower layer,
a second surface opposite to the first surface, and
a side surface connecting the first and second surfaces together,
the second surface is partly exposed from the bonding layer,
the optical element further comprises a low-refractive-index member that is provided on a wheel and in a region where the phosphor layer and the bonding layer are disposed,
the low-refractive-index member has a lower refractive index than the bonding layer, and
in the region where the phosphor layer and the bonding layer are disposed in a circumferential direction on a surface of the wheel, the phosphor layer and the bonding layer extend in a radius direction on at least a part of the wheel.

2. The optical element according to claim 1, wherein the lower layer comprises one or more layers including a substrate.

3. The optical element according to claim 1, wherein the bonding layer covers the phosphor layer so as to face the entire second surface and the entire side surface.

4. The optical element according to claim 1, wherein the bonding layer has an outer surface that is not in intimate contact with the lower layer and the phosphor layer, and
the outer surface of the bonding layer has a curved shape forming a protrusion.

5. The optical element according to claim 1, wherein the bonding layer covers only the side surface inside the phosphor layer and an end of the second surface inside the phosphor layer.

6. The optical element according to claim 1, wherein
a region where the optical element is disposed in the circumferential direction on the surface of the wheel is identified using a set of polar coordinates (r, θ), where an origin point (0) is a center of the wheel, where r denotes a distance in the radius direction from the origin point, where θ denotes an angle of deviation,
a layer of the low-refractive-index member and layers of the phosphor layer and the bonding layer are disposed continuously from a closest point ($r_{min}$, $θ_1$) to a furthest point ($r_{max}$, $θ_2$) along with a change in θ, and
θ changes from $θ_1$ to $θ_2$ continuously, where $θ_1 \neq θ_2$ is satisfied.

7. The optical element according to claim 1, wherein the low-refractive-index member comprises air.

8. An optical device comprising:
the optical element according to claim 1; and
a laser or LED configured to emit excitation light to the phosphor layer.

9. An optical device comprising:
the optical element according to claim 1;
a driver configured to rotate the wheel; and
a light source configured to emit excitation light to the optical element,
wherein the optical device radiates fluorescence when, along with rotation of the wheel, excitation light impinges on the phosphor layer of the optical element disposed in the circumferential direction on at least the surface of the wheel.

10. An optical device comprising:
the optical element according to claim 1;
a light source configured to emit excitation light to the optical element; and
a reflector having a reflective surface configured to reflect fluorescence radiated from the optical element,
wherein the reflective surface of the reflector has a shape such that beams of incident light are reflected so as to exit in parallel in a predetermined direction.

11. An optical device comprising:
the optical element according to claim 1, the lower layer being a permeable substrate; and
a light source configured to emit excitation light to the optical element,
wherein the light source emits excitation light to the first surface via the permeable substrate, and
the phosphor layer radiates fluorescence from the second surface.

12. The optical element according to claim 5, wherein
a height of the low-refractive-index member is the same as a height of the phosphor layer and the bonding layer added.

13. The optical device according to claim 9 further comprising:
a display element;
a light-source optical system configured to guide, to the display element, the fluorescence radiated from the phosphor layer; and
a projection optical system configured to project projection light emitted from the display element onto a screen.

14. The optical device according to claim 9, wherein
the phosphor layer and the bonding layer are disposed in the circumferential direction on at least a part of the surface of the wheel through which excitation light emitted from the light source passes, so as to be divided into a plurality of segments in the circumferential direction,
the optical device further comprises:
a rotation-position sensor configured to acquire a position of rotation of the wheel;
a light-source controller configured to control the light source in accordance with information sent from the rotation-position sensor;
a display element;
a light-source optical system configured to guide, to the display element, light emitted from the light source; and
a projection optical system configured to project projection light emitted from the display element onto a screen, and the optical device controls an output from the light source in accordance with information about the position of rotation of the wheel acquired by the rotation-position sensor.

* * * * *